(No Model.)
E. WENDT.
MEANS OF AUTOMATICALLY OPENING AND CLOSING COVERS OR LIDS OF DRINKING GLASSES, JUGS, &c.
No. 261,113. Patented July 11, 1882.
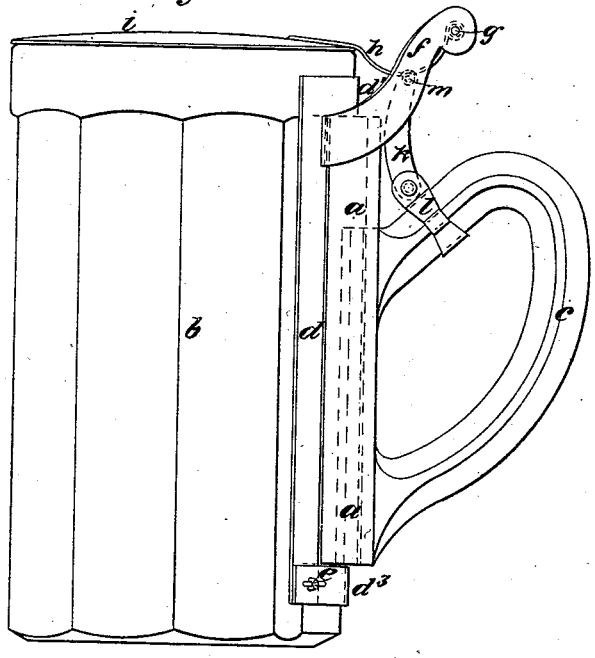
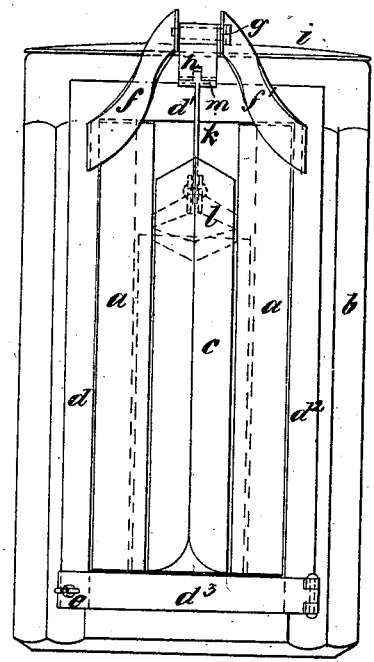
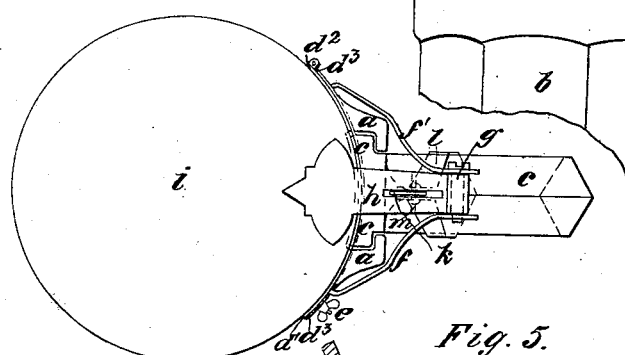
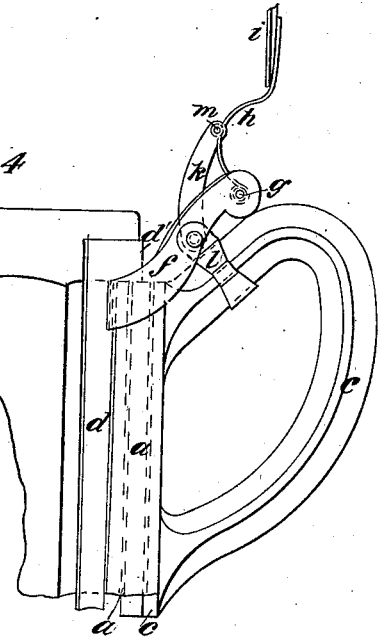
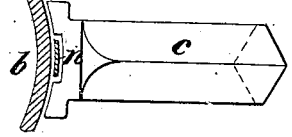
Witnesses
Fred Haynes
Ed. L. Moran
Inventor
Edward Wendt
by his Attorneys
Brown & Brown
N. PETERS, Photo-Lithographer, Washington, D. C.

United States Patent Office.

EDUARD WENDT, OF DRESDEN, SAXONY, GERMANY.

MEANS OF AUTOMATICALLY OPENING AND CLOSING COVERS OR LIDS OF DRINKING-GLASSES, JUGS, &c.

SPECIFICATION forming part of Letters Patent No. 261,113, dated July 11, 1882.

Application filed May 29, 1882. (No model.)

*To all whom it may concern:*

Be it known that I, EDUARD WENDT, in the city of Dresden, Kingdom of Saxony, German Empire, have invented certain new and useful Means of Automatically Opening and Closing the Lids or Covers of Drinking-Glasses, Jugs, &c., of which the following is a specification.

This invention relates to means whereby the lid or cover of a drinking-glass, jug, or other vessel is opened automatically when the glass, jug, or vessel is lifted by the handle, and the cover or lid will be closed automatically when the glass, jug, or vessel is set down and the handle released. This is attained by making the handle to slide within vertical guides provided at the outer surface of the glass, jug, or vessel, and connecting it with an arm of the cover, by which the latter is pivoted to the vessel. When the vessel is seized by the handle the lifting action of the person using the vessel will first cause the handle to rise within its guides, and thereby cause it, through its connection with the lid, to produce the opening of the latter, before the vessel is actually raised from the table or stand. This action will be reversed in setting the vessel down on the table or stand. When this latter action has taken place and the handle is let go, the latter by its own weight will slide down within its guides, and will thereby close the lid or cover.

The invention also relates to the method of removably attaching to the vessel all the parts which, together with the handle and cover or lid, form the whole of the automatic opening and closing apparatus, except the guides, within which the handle works vertically, and which are preferably made in one piece with the glass or jug. This attachment affords great facility for replacing or remounting the entire device on a new glass if the old one is broken, or for separating the parts for transporting them or for cleaning and repairing purposes.

In order that the invention may be perfectly understood, reference is had to the annexed drawings, in which the invention is shown as applied to a beer drinking glass of the usual form.

Figure 1 is a side view of a glass with the invention applied. Fig. 2 is a back view of the same. Fig. 3 is a plan. In these three figures the glass is supposed to stand, and with the handle in the lower position and the lid or cover closed. Fig. 4 is a side view, in part corresponding with Fig. 1, but representing the parts in the position when the handle has been grasped or seized to lift the glass and has been raised to its upper position, and the lid or cover has been thereby opened. Fig. 5 is a detail view, illustrating a modification of the invention.

$a\, a$ are the guides, preferably made in one piece with the glass $b$.

$c$ is the handle, made separate from the glass, and having a vertical part which fits between the two guides $a\, a$, so as to be able to slide vertically up and down therein.

The handle may be made of glass, wood, hard india-rubber, porcelain, or any suitable material.

The guides $a\, a$ are surrounded by a frame, the two sides, $d\, d^2$, and top $d'$ of which are rigidly connected together, whereas the bottom or fourth side, $d^3$, is jointed to $d^2$ by a hinge, and is fastened to $d$ by a small screw, $e$.

The purpose of making the fourth side of the frame to open is to make the whole frame and its appendage (including the handle and the lid or cover) readily removable by opening $d^3$, which permits the frame and all the other parts to be lifted in an upward direction off the glass.

From the sides $d\, d^2$ of the frame two arms or standards, $f\, f'$, project in an upward direction to receive a pin or pivot, $g$, and form a hinge with the arm $h$, to which the lid or cover $i$ is attached. To this arm $h$ there is pivoted at $m$ a connecting-link, $k$, which at its other end is pivoted to the band or clasp $l$, which is secured on the handle $c$.

The raising of the handle $c$ (while the glass is still at rest) will cause the handle to slide upward until its motion is arrested by the bar $d'$ of the frame, and through this motion the link $k$ and arm $h$ will cause the lid or cover $i$ to open in the manner indicated in Fig. 4.

When the glass, after use, is replaced on its stand or a table, the handle $c$ will drop, and with it the cover or lid $i$, the downward motion of the handle being arrested by the bar $d^3$ of the frame.

When for cleaning, repairing, or other purposes it is desired to remove the parts $d\, d'\, d^2\, d^3$, together with the arms $f\, f'$, arm $h$, lid or cover $i$, connecting-link $k$, and handle $c$, from the glass and its guides, the bar $d^3$ is unfastened and turned on its hinge first, and the above-mentioned removable parts may then be lifted entirely away from the glass and its guides.

The attachment of the removable parts to the glass may be modified in the following manner: In this case I dispense with the two side bars, $d\,d^2$, of the frame, and connect the upper bar, $d'$, and the lower bar, $d^3$, by a rod, $n$, which I insert between the glass $b$ and the handle $c$ in a recess provided for this purpose in the handle $c$. This modification will be readily understood by the horizontal section, Fig. 5, showing the glass $b$ in part, the stem of the handle $c$, and the rod $n$ in its recess.

The rod $n$ may be connected with the lower bar, $d^3$, by any suitable attachment for easy disconnection, so as to provide for the removal of all the parts by disconnecting rod $n$ from bar $d^3$.

What I claim as my invention, and desire to secure by Letters Patent, is—

1. The combination, with a glass, jug, or other vessel, of a hinged lid, a handle movable upward and downward thereon, and a connection between said handle and lid, whereby the movement of the handle may effect the opening and closing of the lid, substantially as herein described.

2. The combination, with a glass, jug, or other vessel, a hinged lid, a handle movable upward and downward on the vessel, and a connection between the said handle and the lid for opening and closing the latter by the movement of the handle, of a frame with which the said lid and handle are connected, and which is capable of attachment to and detachment from the vessel, for the attachment and removal together of the said lid and handle and their connections, substantially as herein described.

3. The combination, with a vessel and its movable handle $c$, of arms $f\,f'$, attached rigidly to the vessel, a lid, $i$, attached to an arm, $h$, hinged to the arms $f\,f'$, and a link, $k$, connecting the said arm $h$ with the movable handle, substantially as and for the purpose herein set forth.

4. The combination, with the vessel and its vertically-movable handle, of bars $d\ d^3$, attached to the exterior of the vessel to limit the movement of the handle, substantially as herein described.

5. The combination, with the vessel and the arms $f\,f'$ for supporting the lid, of a removable frame, $d\ d'\ d^2\ d^3$, having a hinged portion, $d^3$, substantially as and for the purpose herein described.

This specification signed by me this 3d day of May, A. D. 1882.

EDUARD WENDT.

Witnesses:
 WILHELM WIESENHÜTTER,
 GEORG RICHTER.